Aug. 13, 1940.　　　W. H. HALLIWELL　　　2,211,742
PRODUCTION OF TUBING
Filed May 27, 1937
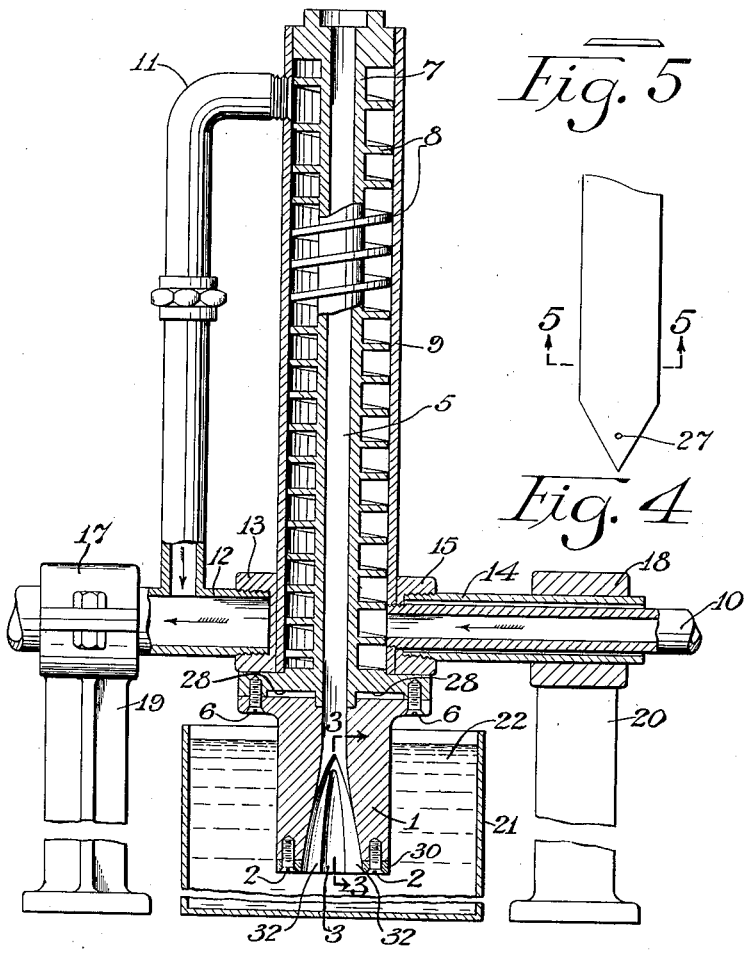
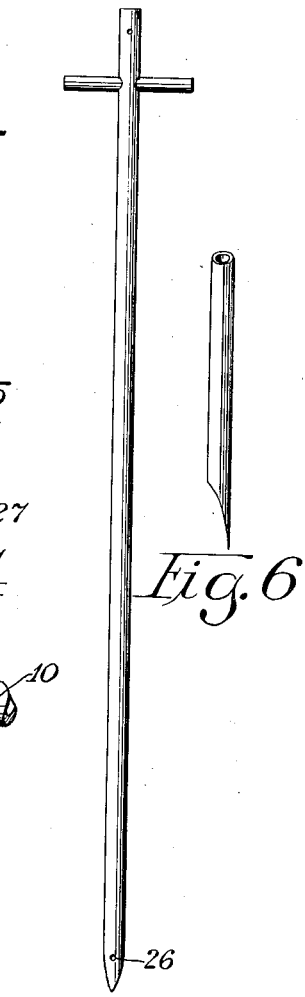
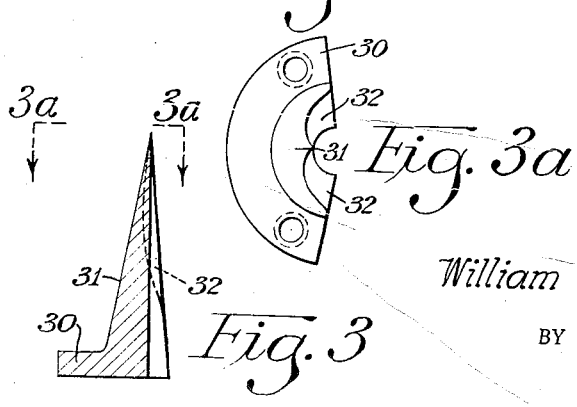
William H. Halliwell INVENTOR.
BY
ATTORNEY.

Patented Aug. 13, 1940

2,211,742

UNITED STATES PATENT OFFICE 2,211,742

PRODUCTION OF TUBING

William H. Halliwell, Newark, N. J., assignor to E. I. du Pont de Nemours & Company, Wilmington, Del., a corporation of Delaware Application May 27, 1937, Serial No. 145,013

4 Claims. (Cl. 18—3)

This invention relates to the production of tubing and, more particularly, to the process of and apparatus for manufacturing tubing from strips of thermoplastic material.

Heretofore, tubing of thermoplastic material has usually been manufactured either by drilling a solid rod or by spirally wrapping a strip of thermoplastic material on a mandrel and subsequently cementing the seams. It has also been proposed to form plastic tubing by wrapping a strip of plastic around a mandrel and then subjecting it to heat and pressure in a mold.

It is an object of the present invention to produce tubing from strips of thermoplastic material cut from a sheet of such material. A further object is to produce such tubing having throughout its length substantially the same ornamental effects as were evidenced by the sheeting from which the strips were cut and without appreciable distortion of the ornamental effects as, for instance, a design, at the seam where the sheeting is joined to form the tube. A further object is to provide an apparatus for producing such tubing. Other objects will be apparent from the description of the invention given hereinafter.

The above objects are accomplished according to the present invention by heating a strip of thermoplastic material to soften same, drawing the softened strip through a forming die to form a tube and, directly thereafter, drawing the tube formed through the passage in a cooling chamber, the passage being substantially identical in cross section with and aligned with the opening of the exit end of the forming die, whereby the thermoplastic material is set while positively held in its tubular form. The tube of thermoplastic material being formed and set in this manner, may then be placed in cold water to insure an absolute set. The tube is then dried and may be cemented together by passing it over a metallic spreader while immersed in a suitable cement. The spreader opens the seams of the tube and permits the cement to set on the edges of the seam. There is sufficient tension in the tube so that the edges come tightly together as the tube leaves the spreader, thus giving a tightly cemented joint. The tube is then allowed to dry at room temperature and is softened in accordance with the usual practice of the plastics art.

The apparatus of the present invention broadly comprises the combination of a forming die and a cooling chamber immediately adjoining the exit end of the forming die and aligned therewith as will be more particularly described with respect to the accompanying drawing wherein:

Fig. 1 is a front elevation, largely in vertical section, of an apparatus according to the present invention;

Fig. 2 is an elevation of a rod adapted to be used with the apparatus shown in Fig. 1;

Fig. 3 is a section on the line 3—3 of the die insert shown in Fig. 1;

Fig. 3A is a plan view in the direction of arrows 3A—3A in Fig. 3;

Fig. 4 shows one end of a strip of thermoplastic material for use in making tubing;

Fig. 5 is a section on the line 5—5 of Fig. 4; and

Fig. 6 is a perspective view of a portion of tubing made according to the present invention.

Referring particularly to Fig. 1, the apparatus comprises the forming die 1 having mounted therein by means of screws 2, 2 the die insert 3. This die insert 3 is shown in detail in Figs. 3 and 3A and will be described in detail hereinafter. The forming die 1 is rigidly connected to the cooling chamber generally indicated by reference numeral 5, by the screws 6—6 passing through the flange of the forming die 1 and into the flange of the cooling chamber 5.

The cooling chamber 5 specifically comprises the tubular member 7 which is provided with the laterally extending helix 8 to aid in regulating the flow of a fluid cooling medium flowing through the jacket formed by the outer tubular member 9. Water or other fluid cooling means is introduced into the cooling chamber by means of the pipe 10 connected to any convenient source of water, or the like, and removed through pipe 11 which connects with the pipe 12 extending horizontally from the cooling chamber 5 at a point diametrically opposite from the pipe 10. To obtain a sturdy construction, pipe 12 is screwed into the internally threaded socket 13 brazed on the tubular member 9. Similarly, a pipe 14, surrounding and concentric with inlet pipe 10, is screwed into socket 15 brazed on the tubular member 9.

The apparatus as described above is pivotally mounted by journaling the pipes 12 and 14 in the snap bearings 17 and 18, respectively, carried by standards 19 and 20. The tank 21 is disposed under the apparatus and contains a heating fluid 22 such as water, or the like.

The formation of tubing in the apparatus is carried out by running the rod shown in Fig. 2 down the passage in the cooling chamber and out through the forming die, the whole apparatus being swung around horizontally to take the forming die out of the heating bath. A strip of thermoplastic material is then attached to the bottom of the rod by means of a pin passing through the hole 26 in the rod and a similar hole 27 (see Fig. 4 showing the end of a strip to be attached to the rod) in the strip of thermoplastic material. The operator then swings the apparatus into vertical position as shown in Fig. 1 whereby the strip of thermoplastic material is immersed in the heating liquid 22 and softened. The rod is then pulled vertically upward and the softened strip of material pulled into the forming die 1 which forms it into a tube, and immediately thereafter into the aligned passage in the cooling chamber 5 which sets the plastic material in tubular shape. After the strip of material has been pulled out of the cooling chamber by means of the rod, it may then be detached, placed in cold water to insure an absolute set, and then cemented together as already described. A section of tubing made in this manner is shown in Fig. 6.

In order that the seam in the tubing formed shall be perfectly square, it is preferable to use a strip which is beveled along the sides as shown in Fig. 5. The bevel is somewhat exaggerated in Fig. 5 for purposes of illustration.

To avoid undue transmittal of heat from the forming die 1 to the cooling chamber 5, it is preferred to cut out a circular groove 28 in the flange of the tubular member 7 adjacent the forming die.

While in its broader concept the apparatus of the present invention does not necessarily comprise a die insert, the use of a die insert as shown in Figs. 1, 3, and 3A is of great practical advantage. Without the die insert, tubing may be formed in the apparatus but the seam of the tubing will not necessarily run straight up and down the tubing but may curve; also, the seam would form right in front of the operator only by chance and it is desirable that the operator should be able to observe the seam continuously as the tubing is pulled up out of the cooling chamber. The chief function of the die insert is to overcome these disadvantages.

By referring to Fig. 1, it will be seen that the lower portion of the passage through the forming die 1 is the shape of a truncated cone whereas the upper portion is cylindrical.

As shown in Figs. 3 and 3A, the die insert 3 comprises the skirt or flange 30 and the portion 31 which extends into the truncated cone shaped portion of the forming die passage. The die insert 3 is not quite a full semi-circle in horizontal section at the lower end and tapers to a point at the top which extends to the top of the truncated cone shaped part of the forming die 1. Due to this construction, the strip of plastic comes into the forming die 1 and buckles away from the die insert 3. The edges of the strip thus bear against the surfaces 32—32 of the die insert 3 which permits the edges to approach each other gradually closer and closer as the strip progresses until the end of the die insert is reached at the point where the cylindrical portion of the forming die passage begins and the edges of the strip meet to form the tubing.

The die insert 3 thus positively controls the position of the seam of the tube being formed and keeps the seam in a straight line up and down the tube which the operator may observe continuously. Also, the die insert 3, by keeping the strip against the surfaces of the forming die 1, insures the formation of a neat, flawless seam with greater regularity than would be possible without it.

It has been found preferable not only to bevel the strip of thermoplastic material as shown in Fig. 5, and also to cut the strip slightly wider than the outside circumference of the finished tube to be made in order that the tension of the tube forcing the edges of the strip together may be greater. For example, in the manufacture of tubing having an outside diameter of 0.5″, a strip $1\frac{19}{32}$″ in width may be used, the strip thus having a width of approximately 0.023″ greater than the outer circumference of the tube. It is also convenient to taper the strip of material at the end attached to the rod, this being shown in Fig. 4.

Due to the arrangement shown in Fig. 1, wherein the forming die is immersed in the heating fluid 22, the die is heated and this is preferable as otherwise the softened plastic would be chilled before it is formed into tubular shape. Chilling at this point tends to produce a tube more or less pear shaped in section. Other means for heating the die may, of course, be employed and, likewise, those skilled in the art will appreciate that the rod to which the strip of plastic material is attached may be pulled upwardly through the apparatus either manually or by suitable mechanical means.

To avoid tying up the apparatus unduly, the strip of thermoplastic material may be softened by heating prior to being attached to the rod.

The process and apparatus of the present invention are applicable for use in forming tubing from all types of thermoplastic material used in tubing. The cellulose derivative plastics, such as cellulose nitrate and cellulose acetate, are probably the most generally used plastics for this purpose but those skilled in the art will appreciate that numerous other thermoplastic materials are well adapted for use in the present invention. The heating fluid used in the tank or receptacle 21 is conveniently water, the boiling point of water being sufficiently high to soften cellulose derivative plastics as desired. Obviously, if a thermoplastic material requiring a temperature appreciably above 100° C. to soften it sufficiently, is used, then some heating fluid having a higher boiling point would be necessary.

The particular cements used to cement the tubing formed according to the present invention and the specific method of cementing the tubing is not a part of the present invention. When using cellulose derivative bases numerous solvents can be used as the cement such as chloroform, acetone, mixtures of acetone and alcohol, and the like. Also, a plastic may be dissolved in such solvents and used as the cement; for example, a solution of cellulose nitrate or acetate and synthetic resin, or a rubber-containing adhesive could be employed.

In the manufacture of tubing according to the present invention there is a tendency during the operation of drawing the plastic strip through the forming die, to stretch the plastic longitudinally, i. e., parallel to the major axis of the tube being formed. In some instances, this may cause an objectionable distortion of the design carried by the plastic. This distortion may be eliminated, it has been discovered, by softening the tube after the seam has been cemented, through application of heat, preferably by immersing the tube in a water bath. The effect of the softening is to cause the tube to shrink longitudinally back to its original length and thereby eliminate the distortion.

An advantage of the present invention is that it provides a practical means of forming tubing in a most economical manner. A further advantage is that tubing formed from strips of thermoplastic material do not have any design in the strips distorted. A particular feature of the present invention is the combination of the heated forming die and the immediately adjoining cooling passage. Due to this combination, the strip of material is formed into tubing while in a thoroughly softened shape so that there is no undue resistance in the plastic material to taking the shape of the forming die and it is chilled to set it while being positively held in the desired shape.

A further feature of the present invention is the general assembly whereby the apparatus may be swung horizontally to facilitate attaching the plastic strip to the rod and then swung vertically to immerse the strip and forming die into the heating fluid. A still further feature of the invention is the use of the die insert as heretofore explained.

As many apparently widely different embodiments of this invention may be made without departing from the spirit and scope thereof, it is to be understood that the invention is not limited to the specific embodiments thereof except as defined in the appended claims.

I claim:

1. An apparatus for molding thermoplastic material in strip form into tubing, comprising a forming die, an elongated cooling chamber rigidly connected to the exit end of said die, said chamber comprising a metal tube the interior passage of which connects directly with the passage in the die and is aligned therewith, the cross sections of the passage at the exit end of the die and of the passage of the tube being substantially identical, and a water jacket surrounding said metal tube, said water jacket having a water inlet opening adjacent the forming die, a water outlet opening adjacent the opposite end of said water jacket, a water inlet pipe rigidly attached to said water jacket at the inlet opening thereof, said water inlet pipe extending at right angles from said water jacket, a second pipe rigidly attached to said water jacket at a point diametrically opposite from said water inlet pipe and extending at right angles from said water jacket, pipe means connecting the water outlet opening of said water jacket to said second pipe, a pair of bearings in which the two pipes extending at right angles to said water jacket are journaled whereby said die and cooling chamber may be pivoted as a unit about the axis formed by said pipes, and a receptacle for a heating fluid positioned below said die and cooling chamber, the level of said heating fluid in said receptacle being such that the die is substantially submerged therein when in vertical position and is free thereof when swung into horizontal position.

2. An apparatus for molding thermoplastic material in strip form into tubing, comprising a forming die through which a strip of thermoplastic material is to be drawn to form it into tubing, the passage through said die being the shape of a truncated cone adjacent the entrance end of the die and of a cylinder adjacent the exit end of the die, the diameter of the exit end of the passage being substantially that of the tubing to be formed, a die insert mounted at the entrance end of said forming die and extending into the passage of said forming die to approximately the top of the truncated cone shaped portion thereof, said die insert forming a pair of surfaces at right angles to the walls of said passage against which surfaces the edges of the strip abut as it enters the forming die and is formed into tubular shape, said surfaces tapering to a point at the inner end of said die insert at which point the edges of the strip abut each other and form a tube.

3. Process of preparing tubing from thermoplastic material which comprises heating a strip of said material to soften same, drawing said softened strip through a heated forming die to form a tube, and directly thereafter through the passage in a cooling chamber, said passage being substantially identical in cross section with and aligned with the opening of the exit end of the forming die, whereby the thermoplastic material is set while positively held in its tubular form, cementing the edges of the tube together, and thereafter longitudinally shrinking said tube by heating said tube to soften it and cooling said tube, said heating and cooling being carried out without subjecting said tube to longitudinal stress.

4. An apparatus for molding thermoplastic material in strip form into tubing, comprising a forming die through which a strip of thermoplastic material is to be drawn to form it into tubing, the passage through said die being the shape of a truncated cone adjacent the entrance end of the die and of a cylinder adjacent the exit end of the die, the diameter of the exit end of the passage being substantially that of the tubing to be formed, and a die insert mounted at the entrance end of said forming die and extending into the passage of said forming die, said die insert forming a pair of surfaces substantially at right angles to the walls of said passage against which surfaces the edges of the strip abut as it is drawn through said forming die whereby the seam of the tubing being formed is maintained in a straight line and the position of the seam with respect to the die is positively controlled.

WILLIAM H. HALLIWELL.